United States Patent

Henry, Jr. et al.

[15] 3,658,542
[45] Apr. 25, 1972

[54] DUAL RESPONSE PHOTOSENSITIVE COMPOSITION CONTAINING ALKYL BENZENESULFONIC ACID AND ARENE SULFONAMIDE

[72] Inventors: Cyrus P. Henry, Jr.; John R. Jeffrey, both of Wilmington, Del.

[73] Assignee: E. I. du Pont de Nemours and Company, Wilmington, Del.

[22] Filed: Dec. 18, 1970

[21] Appl. No.: 99,511

[52] U.S. Cl. ................................................96/90
[51] Int. Cl. ...........................................G03c 1/52
[58] Field of Search.......................................96/90

[56] References Cited

UNITED STATES PATENTS 3,445,234  5/1969  Cescon et al. .....................96/90
3,390,994  7/1968  Cescon ..............................96/90

Primary Examiner—Norman G. Torchin
Assistant Examiner—Won H. Louie, Jr.
Attorney—John R. Powell

[57] ABSTRACT

Improved photosensitive compositions comprising

A. an acid salt of a leuco aminotriarylmethane such as tris (4-N,N-diethylamino-o-tolyl)methane;

B. a hexaarylbiimidazole such as a 2,2'-bis(o-chloro-phenyl)-4,4',5,5'-tetraphenylbiimidazole; and C. a redox couple containing (1) as an oxidant a polynuclear quinone absorbing principally in the 400–550 nm region such as 1,6-pyrenequinone, and (2) as a reductant an acyl ester of triethanolamine such as triethanolamine triacetate, a lower alkyl ester of a nitrilotrialkanoic acid such as 3,3',3''-nitrilotripropionic acid, trimethyl ester or their mixtures;

are obtained with the use of an alkylbenzenesulfonic acid to form the salt of the triarylmethane and an alkyl arenesulfonamide plasticizer. The improved compositions are effective color forming compositions useful in a variety of applications.

21 Claims, No Drawings

DUAL RESPONSE PHOTOSENSITIVE COMPOSITION CONTAINING ALKYL BENZENESULFONIC ACID AND ARENE SULFONAMIDE

BACKGROUND OF THE INVENTION

1. Field of the Invention

This invention relates to improved photosensitive compositions and more particularly is directed to an improved mixture of a photo-activatable color-forming system comprising a salt of a leuco aminotriarylmethane and a hexaarylbiimidazole and a photo-deactivating system comprising a mixture of a polynuclear quinone oxidant and a reductant selected from an acyl ester of triethanolamine, a lower alkyl ester of nitrilopropionic acid, and their mixtures, the improvement comprising the use of an alkylbenzenesulfonic acid as a salt former for the triarylmethane, and the use of an alkyl arene sulfonamide plasticizer.

2. Description of the Prior Art

U.S. Pat. No. 3,390,996 discloses light-activatable color-forming compositions, such as hexaarylbiimidazoles and leuco triarylmethane dyes, which form color on radiation with ultraviolet light, and can be deactivated against such color formation with light of a second wave length by incorporating therewith light-activatable oxidation-reduction systems, such as a visible light-activatable quinone in combination with a source of abstractable hydrogen such as an aliphatic polyether. Irradiation of such systems with ultraviolet light produces color corresponding to the dye form of the leuco triaryl methane dye component, while irradiation with visible light deactivates the color forming components against color formation. Deactivation is attributable to in situ formation of a hydroquinone of the quinone employed, which preferentially reduces photodissociated hexaarylbiimidazole before it can oxidize the leuco triarylmethane dye to color.

The above patent described photoimaging and photofixing processes which involve sequentially exposing the photoimageable/photodeactivatable compositions to the two radiations, in two distinct steps, with the first applied imagewise, to produce a negative or positive of the original image, depending on the order of the exposure.

The compositions of U.S. Pat. No. 3,390,994 are particularly outstanding in their photoimageable/photodeactivatable characteristics, providing fast-access positive prints. This reference discloses acid salts of the aminotriarylmethane dyes including p-toluenesulfonic acid salts. Binders such as cellulose acetate butyrate are also disclosed although there is no disclosure of plasticizers. The image-forming compositions of U.S. Pat. No. 3,445,234 are disclosed to contain acid salts of the aminotriarylmethane dyes including p-toluenesulfonic acid salts, as well as binders and plasticizers. But there is no disclosure of arene sulfonamide plasticizers.

Although highly satisfactory for the stated purposes, the compositions of U.S. Pat. No. 3,390,994 and U.S. Pat. No. 3,445,234 are not perfect. Thus for example they tend to form precipitates on storage with resultant decrease in imaging and deactivation properties, and are sensitive to human handling.

It is an object of this invention to provide photosensitive compositions which form color rapidly, attain maximum color, can be readily deactivated for color formation, and also have outstanding storage stability with freedom from crystallization and phase separation which are detrimental to both sensitometry and aesthetic appearance. These and other objects are accomplished by the invention as described and illustrated.

SUMMARY OF THE INVENTION

In summary, the improved photosensitive compositions of this invention comprise an intimate admixture of a. an acid salt of an oxidizable, substituted, leuco aminotriarylmethane, and a strong acid;

b. a hexaarylbiimidazole which absorbs principally in the ultraviolet region and is a photooxidant for the leuco aminotriarylmethane;

c. a redox couple containing (1) as an oxidant a polynuclear quinone absorbing principally in the 400 nm to 550 nm region and (2) as the reductant a lower alkyl ester of nitriloacetic or nitrilopropionic acid, an acyl ester of triethanolamine of the formula $N(CH_2CH_2OCOR)_3$ wherein R is lower alkyl, or a mixture of these; and d. a plasticizer, the improvement comprising the use of an acid of the formula (1)

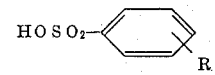

wherein R is alkyl of six to 16 carbon atoms, as the salt forming strong acid and the use of a plasticizer containing (1) from 30 to 80 weight percent of an arene sulfonamide of the formula (2)

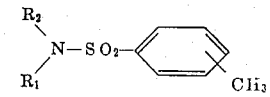

wherein $R_1$ and $R_2$ are the same or different and are hydrogen, alkyl of one to four carbon atoms or 2-hydroxyethyl;

and (2) from 70 to 20 weight percent of another plasticizer.

DESCRIPTION OF THE INVENTION

This invention is directed to improved photosensitive compositions which are activated toward color generation by radiation of wavelength $W_1$ and are rapidly and permanently deactivated toward color generation by radiation of wavelength $W_2$. The improved compositions comprise a color-forming system of (a) an acid salt of an oxidizable, substituted, leuco aminotriarylmethane and an alkylbenzenesulfonic acid and (b) a hexaarylbiimidazole which absorbs principally in the ultraviolet region and is a photooxidant for the leuco aminotriarylmethane; (c) a deactivating system of (1) a polynuclear quinone absorbing principally in the 400-500 nm region and (2) a lower alkyl ester of nitrilotriacetic or nitrilopropionic acid, a short-chained acyl ester of triethanolamine or mixtures of these; and (d) a plasticizer containing from 30 to 80 weight percent of an alkyl arenesulfonamide.

1. The Color-Forming System

The color-forming system comprises a color generator and a photoactivatable oxidant. The color generator is an acid salt of a leuco aminotriarylmethane, which can be oxidized to its colored form by the photoactivatable oxidant. The term "leuco" is used herein to mean essentially colorless.

Representative of aminotriarylmethanes suitable for use in this invention are:

bis(4-amino-2-butylphenyl)(p-dimethylaminophenyl)methane
bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl)methane
bis(4-amino-3,5-diethylphenyl)(o-ethoxyphenyl)methane
bis(4-amino3,5-diethylphenyl)(p-methoxyphenyl)methane
bis(4-amino-3,5-diethylphenyl)phenylmethane
bis(4-amino-3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl)methane bis(p-benzylethylaminophenyl)(p-chlorophenyl)methane
bis(p-benzylethylaminophenyl)(p-diethylaminophenyl)methane
bis(p-benzylethylaminophenyl) (p-dimethylaminophenyl)methane
bis(4-benzylethylamino-o-tolyl) (p-methoxyphenyl)methane
bis(p-benzylethylaminophenyl) phenylmethane
bis(4-benzylethylamino-o-tolyl)(o-chlorophenyl)methane
bis(4-benzylethylamino-o-tolyl) (p-diethylaminophenyl)methane
bis(4-benzylethylamino-o-tolyl) (4-diethylamino-o-tolyl)methane
bis(4-benzylethylamino-o-tolyl)(p-dimethylaminophenyl)methane
bis[2-chloro-4-(2-diethylaminoethyl)ethylaminophenyl](o-chlorophenyl)methane
bis[p-bis(2-cyanoethyl)aminophenyl]phenylmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane
bis(p-dibutylaminophenyl)(p-diethylaminophenyl)methane
bis(4-diethylamino-2-butoxyphenyl)(p-diethylaminophenyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl)methane
bis(p-diethylaminophenyl)(m-butoxyphenyl)methane
bis(p-diethylaminophenyl)(o-chlorophenyl)methane
bis(p-diethylaminophenyl)(p-cyanophenyl)methane
bis(p-diethylaminophenyl)(2,4-dichlorophenyl)methane
bis(p-diethylaminophenyl)(4-diethylamino-1-naphthyl)methane
bis(p-diethylaminophenyl) (p-dimethylaminophenyl)methane
bis(p-diethylaminophenyl)(4-ethylamino-1-naphthyl)methane
bis(p-diethylaminophenyl)2-naphthylmethane
bis(p-diethylaminophenyl)(p-nitrophenyl)methane
bis(p-diethylaminophenyl)2-pyridylmethane
bis(p-diethylamino-m-tolyl)(p-diethylaminophenyl)methane
bis(4-diethylamino-o-tolyl)(o-chlorophenyl)methane
bis(4-diethylamino-o-tolyl)(p-diethylaminophenyl)methane
bis(4-diethylamino-o-tolyl)(p-diphenylaminophenyl)methane
bis(4-diethylamino-o-tolyl)phenylmethane
bis(4-dimethylamino-2-bromophenyl)phenylmethane
bis(p-dimethylaminophenyl)(4-anilino-1-naphthyl)methane
bis(p-dimethylaminophenyl) (p-butylaminophenyl)methane
bis(p-dimethylaminophenyl) (p-sec. butylethylaminophenyl)methane
bis(p-dimethylaminophenyl)(p-chlorophenyl)methane
bis(p-dimethylaminophenyl)(p-diethylaminophenyl)methane
bis(p-dimethylaminophenyl)(4-dimethylamino-1-naphthyl)methane
bis(p-dimethylaminophenyl) (6bis(p-dimethylaminophenyl) (6
bis(p-dimethylaminophenyl)(4-dimethylamino-o-tolyl)methane
bis(p-dimethylaminophenyl)(4-ethylamino-1-naphthyl)methane
bis(p-dimethylaminophenyl)(p-hexyloxyphenyl)methane
bis(p-dimethylaminophenyl)(p-methoxyphenyl)methane
bis(p-dimethylaminophenyl)(5-methyl-2-pyridyl)methane
bis(p-dimethylaminophenyl)2-quinolylmethane
bis(p-dimethylaminophenyl)o-tolylmethane
bis(p-dimethylaminophenyl)(1,3,3-trimethyl-2-indolinylidenemethyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl) (o-fluorophenyl)methane
bis(4-dimethylamino-o-tolyl)1-naphthylmethane
bis(4-dimethylamino-o-tolyl)phenylmethane
bis(p-ethylaminophenyl)(o-chlorophenyl)methane
bis(4-ethylamino-m-tolyl) (o-methoxyphenyl)methane
bis(4-ethylamino-m-tolyl) (p-methoxyphenyl)methane
bis(4-ethylamino-m-tolyl)(p-dimethylaminophenyl)methane
bis(4-ethylamino-m-tolyl)(p-hydroxyphenyl)methane
bis[4-ethyl(2-hydroxyethyl)amino-m-tolyl](p-diethylaminophenyl)methane
bis[p-(2-hydroxyethyl)aminophenyl]chlorophenyl)methane
bis[p-(bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-flurophenyl)methane
bis(2-bromo-4-diethylaminophenyl)phenylmethane
bis(2-butoxy-4-diethylaminophenyl)phenylmethane
bis(4-diethylamino-o-tolyl)(p-methoxyphenyl)methane
bis(4-diethylamino-2-methoxyphenyl)(p-nitrophenyl)methane
bis(4-diethylamino-1-naphthyl)(4-diethylamino-o-tolyl)methane
bis(4-diethylamino-o-tolyl)1-naphthylmethane
tris(4-dimethylamino-2-chlorophenyl)methane
bis(4dimethylamino-2,5-dimethylphenyl)phenylmethane
bis(4-dimethylamino-o-tolyl)(o-bromophenyl)methane
bis(4-ethylbenzylamino-o-tolyl)(p-methoxyphenyl)methane
tris(p-dioctylamino-o-tolyl)methane
bis(4-diethylamino-o-tolyl)(4-methoxy-1-naphthyl)methane
bis(4-diethylamino-o-tolyl)(3,4,5-trimethoxyphenyl)methane
bis(4-diethylamino-o-tolyl)(p-hydroxyphenyl)methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl sulfone
4-[bis(4-diethylamino-o-tolyl)-methyl]-methylsulfonanilide
4-[bis(4-diethylamino-o-tolyl)-methyl]-p-tolylsulfonanilide
bis(4-diethylamino-o-tolyl)(p-nitrophenyl)methane
bis(4-diethylamino-o-tolyl)(2-diethylamino-4-methyl-5-thiazolyl)methane bis(4-diethylamino-o-tolyl)(2-diethylamino-5-methyl-6-benzoxazolys)methane
bis(4-diethylamino-o-tolyl)(2-diethylamino-5-methyl-6-benzothiazolyl)methane
bis(4-diethylamino-o-tolyl)(1-ethyl-2-methyl-3-indolyl)methane
bis(4-diethylamino-o-tolyl)(1-benzyl-2-methyl-3-indolyl)methane
bis(4-diethylamino-o-tolyl)(1-ethyl-2-methyl-5-methoxyl-3-indolyl)methane
bis(1-o-xylyl-2-methyl-3-indolyl)(4-diethylamino-o-tolyl)methane
bis(4-diethylamino-o-tolyl)(1-ethyl-5-indolinyl)methane
bis(1-isobutyl-6-methyl-5-indolinyl)(4-diethylamino-o-tolyl)methane
bis(4-diethylamino-o-tolyl)(8-methyl-9-julolindinyl)methane
bis(4-diethylamino-2-acetamidophenyl)(4-diethylamino-o-tolyl)methane
4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)(4-acrylamidophenyl)methane
bis(4-diethylamino-o-tolyl)(p-benzylthiophenyl)methane
bis(4-diethylamino-o-tolyl)(4-isopropylthio-3-methylphenyl)methane
bis(4-diethylamino-o-tolyl)(4-chlorobenzylthiophenyl)methane
bis(4-diethylamino-o-tolyl)(2-furyl)methane
bis(4-diethylamino-o-tolyl)(3,4-methylenedioxyphenyl)methane
bis(4-diethylamino-o-tolyl)(3,4-dimethoxyphenyl)methane
bis(4-diethylamino-o-tolyl)3-methyl-2-thienyl)methane
bis(4-diethylamino-o-tolyl)(2,4-dimethoxyphenyl)methane
bis[4-(2-cyanoethyl)(2-hydroxyethyl)amino-o-tolyl]-(p-benzylthiophenyl)methane
bis[4-(2cyanoethyl) (2-hydroxyethyl)amino-o-tolyl]-2-thienylmethane
bis(4-dibutylamino-o-tolyl)2-thienylmethane
bis(4-diethylamino-2-ethylphenyl)(3,4-methylene-dioxyphenyl)methane
bis(4-diethylamino-2-fluorophenyl)(p-benzylthiophenyl)methane
bis(4-diethylamino-2-fluorophenyl)(3,4-methylene-dioxyphenyl)methane
bis(4-diethylamino-o-tolyl)(p-methylthiophenyl)methane
bis(4-diethylamino-o-tolyl)2-thienylmethane
bis(4-dimethylamino-2-hexylphenyl)(p-butylthiophenyl)methane
bis[4-(N-ethylanilino)-o-tolyl](3,4-dibutoxyphenyl)methane
bis[4-bis(2-hydroxyethyl)amino-2-fluorophenyl](p-benzylthiophenyl)methane
bis(4-diethylamino-o-tolyl)(p-chlorophenyl)methane
bis(4-diethylamino-o-tolyl)(p-bromophenyl)methane
bis(4-diethylamino-o-tolyl)(p-fluorophenyl)methane
bis(4-diethylamino-o-tolyl)(p-tolylmethane)
bis(4-diethylamino-o-tolyl) 3-methylthienyl methane Other aminotriarylmethanes suitable for use in this invention are:
bis(p-diethylamino-o-tolyl)(p-n-hexanamidophenyl)methane
bis(p-diethylamino-o-tolyl)(p-n-octanamidophenyl)methane
bis(p-diethylamino-o-tolyl)(p-n-dodecanamidophenyl)methane
bis(p-diethylamino-o-tolyl)(p-n-hexadecanamidophenyl)methane
bis(p-diethylamino-o-tolyl)(p-cyclohexanamidophenyl)methane
bis(p-diethylamino-o-tolyl)(p-1-adamantylcarboxamidophenyl)methane
bis(p-diethylamino-o-tolyl)(p-benzamidophenyl)methane
bis(p-diethylamino-o-tolyl)(p-phenylacetamidophenyl)methane
bis(p-diethylamino-o-tolyl)(p-α-methoxyacetamidophenyl)methane
bis(p-diethylamino-o-tolyl)(p-α-carbethoxyacetamidophenyl)methane
bis(p-diethylamino-o-tolyl)(p-n-octylsulfonamidophenyl)methane
bis(p-diethylamino-o-tolyl)(p-α-methoxyacetamido-m-methoxyphenyl)methane
bis(p-diethylamino-o-tolyl)(p-n-octanamido-m-methoxyphenyl)methane
bis(p-diethylamino-o-tolyl)(p-n-octylsulfonamido-m-methoxyphenyl)methane
bis(p-diethylamino-o-tolyl)(p-acetamido-m-methoxyphenyl)methane
bis(p-diethylamino-o-tolyl)(3,5-dimethyl-4-n-octanamidophenyl)methane
bis(p-diethylamino-o-tolyl)(3,5-dimethoxyphenyl)methane
The diamide of bis(p-diethylamino-o-tolyl)(p-aminophenyl)methane and oxalic acid.
The diamide of bis(p-diethylamino-o-tolyl)(p-aminophenyl)methane and malonic acid.
The diamide of bis(p-diethylamino-o-tolyl)(p-aminophenyl)methane and glutaric acid.
The diamide of bis(p-diethylamino-o-tolyl)(p-aminophenyl)methane and adipic acid.

Preferably the aminotriarylmethane is one wherein at least two of the aryl groups are phenyl groups having (a) an $R_1R_2N$- substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzooxazolyl, quinolyl, benzothiazolyl, phenyl, naphthyl, or such afore-listed groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsufonyl, lower alkylsulfonamido, $C_6$ to $C_{10}$ arylsulfonamido, nitro or benzylthio. The third aryl group can of course be the same as the first two.

Particularly preferred aminotriarylmethanes have the following structural formula:

(3) 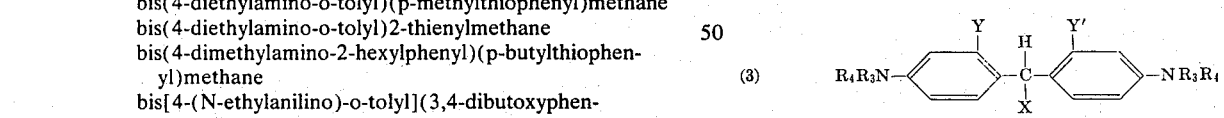

wherein $R_3$ and $R_4$ are selected from benzyl or lower alkyl (preferably ethyl), Y and Y' are lower alkyl (preferably methyl) and X is selected from

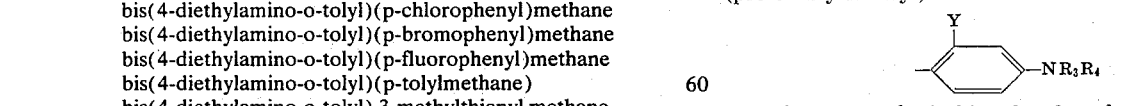

p-methoxyphenyl, 2-thienyl, phenyl, 1-naphthyl, 3,4-dimethoxyphenyl, 3,4-methylene-dioxyphenyl, or p-benzylthiophenyl. Preferably X is selected from

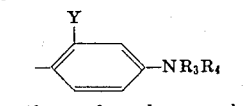

phenyl, 3,4-dimethoxyphenyl, or p-benzylthiophenyl.

These triarylmethanes are employed as salts of alkylbenzenesulfonic acids, the proportion of acid usually varying from 0.33 mole to 1 mole per amino group. Use of these acids to form the triarylmethane salts appear to deter crystallization on storage possibly because of oily or waxy properties imparted by the long alkyl chain.

Suitable alkylbenzenesulfonic acids are those of the formula (1) 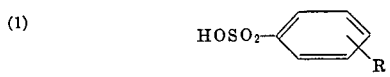

wherein R is alkyl of six to 16 atoms. It should be understood of course that the alkyl group can be branched or straight chain and that mixtures of these sulfonic acids can also be used. A preferred group of alkylbenzenesulfonic acids are those in which R is alkyl of eight to 14 carbon atoms and dodecylbenzenesulfonic acid is particularly preferred as the acid component as it is the cheapest and most readily available.

The hexaarylbiimidazoles suitable as photoactivatable oxidants for the aminotriarylmethanes are the 2,2', 4,4', 5,5'-hexaarylbiimidazoles, sometimes called 2,4,5-triarylimidazolyl dimers, that are photodissociable to the corresponding triarylimidazolyl radicals. These hexaarylbiimidazoles absorb maximally in the region of 255 nm to 275 nm wavelength and usually show some lesser absorption in the region of 300 nm to 375 nm wavelength. The absorption bands tend to tail out to include wavelengths as high as 420 nm but they normally require light rich in 255 nm to 375 nm wavelength for dissociation. Thus the radiation of $W_1$ is 200 nm to 420 nm.

The hexaarylbiimidazoles can be represented by the formula (4) 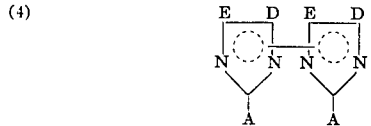

wherein A, E, and D represent aryl groups which can be the same or different, carbocyclic or heterocyclic, unsubstituted or bearing substituents that do not interfere with the dissociation of the hexaarylbiimidazole or with the oxidation of the leuco aminotriarylmethane. Each dotted circle in the formula stands for four delocalized electrons (i.e., two conjugated double bonds) which satisfy the valences of the carbon and nitrogen atoms of the imidazolyl ring. The E and D aryl groups can each be substituted with zero to three substituents and the A aryl groups can be substituted with zero to four substituents.

The aryl groups include one- and two-ring aryls, such as phenyl, biphenyl, naphthyl, pyridyl, furyl and thienyl. Suitable inert substituents on the aryl groups have Hammett sigma (para) values in the −0.5 to 0.8 range, and are other than hydroxyl, sulfhydryl, amino, alkylamino or dialkylamino groups. Representative substituents and their sigma values, (relative to H = .00), as given by Jaffe, Chem. Rev. 53, 219–233(1953 are: methyl (−0.17), ethyl (−0.15), t-butyl (−0.20), phenyl (0.01), butoxy (−0.32), phenoxy (−0.03), fluoro (0.06), chloro (0.23), bromo (0.23), iodo (0.28), methylthio (−0.05), nitro (0.78), ethoxycarbonyl (0.52), and cyano (0.63). The foregoing substituents are preferred; however, other substituents which may be employed include trifluoromethyl (0.55), chloromethyl (0.18), carboxyl (0.27), cyanomethyl (0.01), 2-carboxyethyl (−0.07), and methylsulfonyl (0.73). Thus, the substituents can be halogen, cyano, lower hydrocarbyl (including alkyl, halo alkyl, cyanoalkyl, hydroxyalkyl and aryl), lower alkoxy, aryloxy, lower alkylthio, arylthio, sulfo, alkyl sulfonyl, arylsulfonyl, nitro, and lower alkylcarbonyl. In the foregoing list, alkyl groups referred to are preferably of one to six carbon atoms; while aryl groups referred to are preferably of six to 10 carbons atoms.

Preferably the aryl radicals are carbocyclic, particularly phenyl, and the substituents have Hammett sigma values in the range −0.4 to +0.4, particularly lower alkyl, lower alkoxy, chloro, fluoro, bromo, and benzo groups.

In a preferred hexaarylbiimidazole class, the 2 and 2' aryl groups are phenyl rings bearing an ortho substituent having a Hammett sigma value in the range −0.4 to +0.4. Preferred ortho substituents are fluorine, chlorine, bromine, methyl and methoxy groups, especially chloro. Such biimidazoles tend less than others to form color when the light-sensitive compositions are applied to and dried on substrates at somewhat elevated temperatures, e.g., in the range 70°–100° C.

Most preferably, the 2-phenyl ring carries only the above-described ortho group, and the 4- and 5-phenyl rings are either unsubstituted or substituted with lower alkoxy.

Preferred hexaarylbiimidazoles include 2,2'-bis(o-chlorophenyl)-4,4',5,5'-tetraphenylbiimidazole and 2,2'-bis(o-chlorophenyl)-4,4',5,5'-tetrakis(m-methoxyphenyl)biimidazole.

Representative of hexaarylbiimidazoles suitable for use in this invention are:
2,2'-bis(o-bromophenyl)-4,4',5,5'-tetraphenylbiimidazole
2,2'-bis(p-bromophenyl)-4,4',5,5'-tetraphenylbiimidazole
2,2'-bis(o-chlorophenyl-4,4',5,5'-tetrakis(p-methoxyphenyl)biimidazole
2,2'-bis(o-chlorophenyl)-4,4',5,5'-tetraphenylbiimidazole
2,2'-bis(p-chlorophenyl)-4,440 ,5,5'-tetrakis(p-methoxyphenyl)biimidazole
2,2'-bis(p-cyanophenyl)-4,4',5,5'-tetrakis(p-methoxyphenyl)biimidazole
2,2'-bis(2,4-dichlorophenyl)-4,4',5,5'-tetraphenylbiimidazole
2,2'-bis(2,4-dimethoxyphenyl)-4,4',5,5'-tetraphenylbiimidazole
2,2'-bis(o-ethoxyphenyl)-4,4',5,5'-tetraphenylbiimidazole
2,2'-bis(m-fluorophenyl)-4,4',5,5'-tetraphenylbiimidazole
2,2'-bis(o-fluorophenyl)-4,4',5,5'-tetraphenylbiimidazole
2,2'-bis(p-fluorophenyl)-4,4',5,5'-tetraphenylbiimidazole
2,2'-bis(o-n-hexyloxyphenyl)-4,4',5,5'-tetraphenylbiimidazole
2,2'-bis(o-n-hexylphenyl)-4,4',5,5'-tetrakis(p-methoxyphenyl)biimidazole
2,2'-bis(3,4-methylenedioxyphenyl)-4,4',5,5'-tetraphenylbiimidazole
2,2'-bis(o-chlorophenyl)-4,4',5,5'-tetrakis(m-methoxyphenyl)biimidazole
2,2'-bis(o-chlorophenyl)-4,4',5,5'-tetrakis[m-(β-phenoxyethoxyphenyl)biimidazole
2,2'-bis(2,6-dichlorophenyl)-4,4',5,5'-tetraphenylbiimidazole
2,2'-bis(o-methoxyphenyl)-4,4',5,5'-tetraphenylbiimidazole
2,2'-bis(p-methoxyphenyl)-4,4'-bis(o-methoxyphenyl)-5,5'-diphenylbiimidazole
2,2'-bis(o-nitrophenyl)-4,4',5,5'-tetraphenylbiimidazole
2,2'-bis(p-phenylsulfonylphenyl)-4,4',5,5'-tetraphenylbiimidazole
2,2'-bis(p-sulfamoylphenyl)-4,4',5,5'-tetraphenylbiimidazole
2,2'-bis(2,4,6-trimethylphenyl)-4,4',5,5'-tetraphenylbiimidazole
2,2'-di-4-biphenylyl-4,4',5,5'-tetraphenylbiimidazole
2,2'-di-1-naphthyl-4,4',5,5'-tetrakis(p-methoxyphenyl)biimidazole
2,2'-di-9-phenanthryl-4,4',5,5'-tetrakis(p-methoxyphenyl)biimidazole
2,2'-diphenyl-4,4',5,5'-tetra-4-biphenylylbiimidazole
2,2'-diphenyl-4,4',5,5'-tetra-2,4-xylylbiimidazole
2,2'-di-3-pyridyl-4,4',5,5'-tetraphenylbiimidazole
2,2'-di-3-thienyl-4,4',5,5'-tetraphenylbiimidazole
2,2'-di-o-tolyl-4,4',5,5'-tetraphenylbiimidazole
2,2'-di-p-tolyl-4,4'-di-o-tolyl-5,5'-diphenylbiimidazole
2,2'-di-2,4-xylyl-4,4',5,5'-tetraphenylbiimidazole
2,2',4,4',5,5'-hexakis(p-benzylthiophenyl)biimidazole
2,2',4,4',5,5'-hexa-1-naphthylbiimidazole
2,2',4,4',5,5'-hexaphenylbiimidazole
2,2'-bis(2-nitro-5-methoxyphenyl)-4,4',5,5'-tetraphenylbiimidazole
2,2'-bis(o-nitrophenyl)-4,4',5,5'-tetrakis(m-methoxyphenyl)biimidazole
2,2'-bis(2-chloro-5-sulfophenyl)-4,4',5,5'-tetraphenylbiimidazole 2,2'-bis(o-chlorophenyl)-4,4'-bis(p-methoxyphenyl)-5,5'-diphenylbiimidazole 2,2'-bis(o-chloro-p-methoxyphenyl)-4,4',5,5'-tetraphenylbiimidazole 2,2'-bis(o-chlorophenyl)-4,4',5,5'-tetrakis(m,p-dimethoxyphenyl)biimidazole 2,2'-bis(o-chlorophenyl)-4,4',5,5'-tetrakis(m-nitrophenyl)biimidazole The above dimers of 2,4,5-triarylimidazolyl radicals which provide light-activated oxidants for the aminotriarylmethanes are characterized by the property of dissociating into two triarylimidazolyl free radicals when illuminated with ultraviolet light of wavelength from about 200 nm to 420 nm. Such a dissociation may be detected, and the existence of the free radicals discerned, by electron paramagnetic resonance, by ultraviolet spectra, and by visible spectra.

The hexaarylbiimidazoles of formula (1) are conveniently obtained by methods known to the art. The preferred method, involving oxidative dimerization of the corresponding triarylimidazole with ferricyanide in alkali, generally yields the 1,2'-hexaarylbiimidazoles, although other isomers, such as the 1,1', 1,4',2,2',2,4' and 4,4'-hexaarylbiimidazoles are sometimes also obtained admixed with the 1,2' isomer. For the purposes of this invention, it is immaterial which isomer is employed so long as it is photo-dissociable to the triarylimidazolyl radical, as discussed above.

The molar ratio of hexaarylbiimidazole to aminotriarylmethane in the compositions of this invention will ordinarily range from about 0.1:1 to about 10:1 and preferably from about 1:1 to about 3:1.

2. The Deactivating System

The deactivating component of the photosensitive compositions of this invention comprises a second photoactivatable oxidant and a reductant. The deactivating component is sometimes referred to as a "redox couple." The second photoactivatable oxidant is a polynuclear quinone absorbing principally in the 400–550 nm region such as 1,6-pyrenequinone, 1,8-pyrenequinone, 9,10-phenanthrenequinone and mixtures thereof. The preferred oxidant is 9,10-phenanthrenequinone. Thus the radiation at the deactivating light ($W_2$) ranges from 400–550 nm.

The reductant component of the deactivating system is a $C_1$ to $C_4$ alkyl ester of nitrilotriacetic acid or of 3,3',3''-nitrilotripropionic acid, preferably trimethyl nitrilopropionate; an ester of the formula (5)
$$N \left( CH_2-CH_2-O-\overset{O}{\underset{\|}{C}}-R \right)_3$$

wherein R is lower alkyl; or a mixture of these.

Representative of suitable esters of the above formula are triethanolamine triacetate, triethanolamine tripropionate, triethanolamine tributyrate, and triethanolamine trivalerate. The preferred esters are triethanolamine triacetate and triethanolamine tripropionate. These esters are readily prepared by esterification of a suitable carboxylic acid, or its derivative such as the acid chloride or anhydride, with triethanolamine, or by transesterification. See J.Am.Chem.Soc., 47 2966 (1925) or J.Chem.Soc., Japan, Ind.Chem. Sect. 57, 402 (1954).

The amount of quinone component used in the redox couple is based on the biimidazole used and molar ratios of from 0.01:1 to 2:1 can be employed with ratios of 0.2:1 to 0.6:1 being preferred. The amount of reductant component used in the redox couple is based on the quinone component and molar ratios of from about 1:1 to about 90:1 can be employed with ratios of from 10:1 to 20:1 being preferred.

3. Plasticizers

The plasticizer of the photosensitive compositions of this invention must contain between 30 and 80 percent by weight and preferably 40 to 70 percent by weight of an alkyl arenesulfonamide of the formula (2)
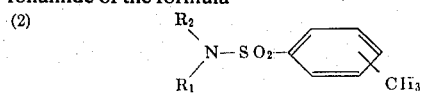

wherein $R_1$ and $R_2$ are the same or different and are hydrogen, alkyl of one to four carbon atoms or 2-hydroxyethyl.

Representative of sulfonamides suitable for use in this invention are

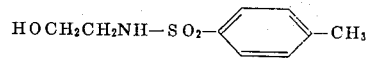

and

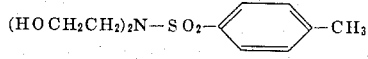

Preferred sulfonamides are N-ethyl-p-toluenesulfonamide,

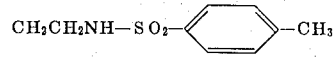

as well as mixtures of ortho and para N-ethyl toluenesulfonamides.

While it is possible to use 100 percent arenesulfonamide as plasticizer, it is more practical to use a mixture. The remainder of the plasticizer can be any of the many plasticizers recognized as suitable for use in photosensitive compositions and include the polyethylene glycols such as the commercially available carbowaxes, and related materials such as substituted phenolethylene oxide adducts, for example the polyethers obtained from o-, m- and p-cresol, o-, m-, and p-phenylphenol and p-nonylphenol, including commercially available materials such as "Igepal" alkyl phenoxy polyoxyethylene ethanols. Other suitable plasticizers are the acetates, propionates, butyrates and other carboxylate esters of ethylene glycol, diethylene glycol, glycerol, pentaerythritol and other polyhydric alcohols, and alkyl phthalates and phosphates such as dimethyl phthalate, diethyl phthalate, dioctyl phthalate, tributyl phosphate, trihexyl phosphate, trioctyl phosphate, triphenyl phosphate, tricresyl phosphate and cresyl diphenyl phosphate.

Total amounts of plasticizer used in the compositions of this invention will range from 1:20 to 5:3 parts by weight based on the weight of binder material used, and preferably 1:5 to 1:2 parts by weight based on the weight of binder. In those formulations of this invention which do not require the presence of a binder there is of course no necessity for a plasticizer to be present. However, use of a plasticizer under these conditions is in no way detrimental and amounts which can be added are largely controlled by the economic aspects of using an unnecessary ingredient.

Those compositions of this invention which contain a preferred alkyl arenesulfonamide or a preferred amount of an alkyl arenesulfonamide of formula (2) show improved physical properties including adhesion, resistance to finger-printing and shelf stability. In particular, tendencies towards phase separation and crystallization in the coating on storage are markedly reduced.

4. Other Components

Polymeric binders can also be present in the light-sensitive compositions to thicken them or adhere them to substrates. The binders can also serve as a matrix for the color-forming composition and the mixture can be cast, extruded or otherwise formed into unsupported imageable films. Light-transparent and film-forming polymers are preferred. Examples are ethyl cellulose, polyvinyl alcohol, polyvinyl chloride, polystyrene, polyvinyl acetate, poly-(methyl, propyl or butyl methacrylate), cellulose acetate, cellulose butyrate, cellulose acetate butyrate, cellulose nitrate, chlorinated rubber, copolymers of the above vinyl monomers, and gelatin. Preferred binders are cellulose acetate and cellulose acetate butyrate with the latter most preferred. Binder or matrix amounts vary from about 0.5 part to about 200 parts by weight per part of combined weight of the leuco aminotriarylmethane and hexaarylbiimidazole. In general, from 0.5 to 10 parts are used as adhesive or thickener, while higher amounts are used to form the unsupported films.

The binder composition can also contain inert infusible fillers such as sand, titanium dioxide, organophilic colloidal silica, bentonite, powdered glass, micron-sized alumina and mica in minor, non-interfering amounts. Indeed, formulations containing micron-sized silicas, as, for example, the "Syloid" silica gels, sold by W. R. Grace & Co., are particularly useful for providing a "tooth" for pencil or ink receptivity and eliminating blocking tendencies.

Conversely, for some applications the photosensitive compositions of this invention may contain no binder. Binderless and binder-containing compositions, as described herein, are useful for "lofting," the coating of certain metals and enameled surfaces with a photosensitive solution to yield a photosensitive plate with good abrasion resistance and high optical density after processing. For example, metal substrates such as "Preparakote" coated steel or aluminum, anodized aluminum and zinc are coated with photosensitive solutions of this invention which absorb or are imbibed into or onto the surface of the metal. These systems yield a product with high contrast and very good abrasion resistance when irradiated with ultraviolet ($W_1$) and visible light ($W_2$) as described herein.

The photosensitive compositions of this invention are of considerable interest for lofting, due to the simplicity of imaging and fixing (i.e., deactivation), and since they possess sufficient anchorage or imbibition to enable cutting or filing of the finished plates.

In general solvents are employed which are volatile at ordinary pressures. Examples are amides such as N,N-dimethylformamide and N,N-dimethylacetamide; alcohols and ether alcohols such as methanol, ethanol, 1-propanol, 2-propanol, butanol, and ethylene glycol; esters such as methyl acetate and ethyl acetate; aromatics such as benzene, o-dichlorobenzene and toluene; ketones such as acetone, methyl ethyl ketone and 3-pentanone; aliphatic halocarbons such as methylene chloride, chloroform, 1,1,2-trichloroethane, 1,1,2,2-tetrachloroethane and 1,1,2-trichloroethylene; miscellaneous solvents such as dimethylsulfoxide, pyridine, tetrahydrofuran, dioxane, dicyanocyclobutane and 1-methyl-2-oxo-hexamethyleneimine; and mixtures of these solvents in various proportions as may be required to attain solutions. It is often beneficial to leave a small residue of solvent in the dried composition so that the desired degree of imaging can be obtained upon subsequent irradiation. Ordinary drying such as that employed in paper manufacture or in film casting results in the retention of ample solvent to give a composition with good photosensitivity. The compositions so produced are dry to the touch and stable to storage at room temperature. Indeed, moisture of the air is absorbed by many of the compositions, particularly those comprising an acid salt of an aminotriarylmethane on cellulosic substrates, and serves as a suitable solvent.

5. Preparation of the Composition

It has been discovered that the quinone photodeactivator component and a polyether plasticizer component, when present, tend to undergo a dark reaction in alkaline or neutral media. This dark reaction tends to lower the effective concentration of the photodeactivator. A specific example of this dark reaction, under neutral or alkaline conditions, has been observed between 9,10-phenanthrenequinone and the polyether obtained on reacting o-phenylphenol with 2.28 moles of ethylene oxide.

It has further been found that the above described dark reaction is absent under acidic conditions. Thus, to obtain optimum deactivatable photosensitive compositions, the order of ingredient addition should avoid having both quinone and polyether present before an acid is added. The preferred order of addition is as follows: (a) solvent, (b) plasticizer, (c) binder, (d) leuco aminotriarylmethane, (e) hexaaryl- biimidazole, (f) acid, (g) quinone photodeactivator and (h) reductant. Respective examples of the above are (a) acetone-isopropanol, (b) o-phenylphenol condensed with 2.25 moles ethylene oxide and N-ethyl-p-toluene-sulfonamide, (c) cellulose acetate butyrate, (d) tris(4-N,N-diethylamino-o-tolyl)methane, (e) 2,2'-bis(2-chlorophenyl)-4,4',5,5'-tetrakis(3-methoxyphenyl)biimidazole, (f) dodecylbenzenesulfonic acid, (g) 1,6- and 1,8-pyrenequinone and 9,10-phenanthrenequinone, (h) 1:1 mixture of triethanolamine triacetate and trimethyl nitrilotripropionate.

Finally, the selection of the leuco triarylmethane will depend upon the color and quality of the image desired. Two or more leuco triarylmethanes may be used in combination to obtain a particular color or shade of color or to provide a neutral gray or black coloration in the image.

6. Substrates

In use, the compositions of this invention are usually coated upon or impregnated in substrates. The substrates are materials commonly used in the graphic arts and in decorative applications and include paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, polypropylene, polyvinylacetate, polymethyl methacrylate and polyvinylchloride; textile fabrics; glass; wood; and metals. Opaque as well as transparent substrates can be used. Substrates in which the photosensitive components are dissolved or which bear the photosensitive components as a coating on the reverse side of the substrate, i.e., on the side away from the ultraviolet light source used for image formation, must be transparent not only in the visible region but transparent to a portion of the ultraviolet range useful for image formation. The substrates must also be inert to the photosensitive materials and preferably should not dissolve the active components but absorb them and retain sufficient solvent to provide a medium for rapid image formation upon irradiation.

In applying a solution to paper, films, fabrics, or to the surface of rigid substrates such as glass, wood or metals the solution can be sprayed, brushed, applied by a roller or an immersion coater, flowed over the surface, picked up by immersion or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 milligram per square inch to about 5.0 milligrams per square inch of the triarylmethane and equivalent amount of the hexaarylbiimidazole. Images of greater and lesser intensity of color are provided by the application of greater and lesser amounts of the triarylmethane to the substrate. For coating roll papers and films there may be used such typical devices for continuously laying down wet films as nip fed three roll reverse roll coating heads, gravure coaters, trailing blade coaters, knife over roll, four-roll pan fed, and Mayer bar coating heads (wherein the coating thickness is controlled by a threaded or a wire wound bar). The wet thickness is adjusted such that the dry thickness after solvent removal is in the desired range (about 0.05–1.5 mil, usually around 0.3–0.5 mil on paper, 0.8–1.1 mil on film).

When the substrate is paper, besides the typical one-side coating, photosensitive compositions of this invention can be used to prepare the desirable two-side coated paper.

A particularly useful film substrate is a new adherable polyester film manufactured by Imperial Chemical Industries known as "Melinex" X-503.

Similar useful adherable substrates are "Cronar" or "Mylar" polyester film, and "Mylar" coated with "Adcote" 1069, a polyurethane primer commercially available from the Morton Chemical Co. An effective "Adcote" 1069 coating weight range for enhancement of adhesion is in the range 0.05–0.4 pound per 3000 square feet of film surface.

The substrates bearing a solution of the compositions of this invention can be dried simply at room temperature. They can also be dried under vacuum at room temperature, by forced air solvent evaporation, or at elevated temperatures, as by radiant heating. The upper temperature limit is important in combination with exposure time. A short exposure to heat of 90° C. may not be detectably harmful, while several hours' exposure to this heat may reduce the light sensitivity of the composition.

7. Light Sources, Image Formation and Deactivation

Any convenient source of ultraviolet light can be used to activate the color-forming system to induce the formation of an image, whereas convenient sources of visible light can be used to achieve deactivation. In general, light sources that supply radiation in the region between about 200 nm and about 420 nm ($W_1$) are useful in producing images with the leuco triarylmethane/hexaarylbiimidazole compositions on numerous substrates. Light sources generating radiation in the region between about 400 nm and about 550 nm ($W_2$) are useful to achieve deactivation. Among the light sources which have been employed are sunlamps, pulsed and continuous Xenon flash lamps, germicidal lamps, ultraviolet lamps providing specifically light of short wavelength (2537 A.) and lamps providing light of longer wavelengths, narrow or broad band, centered near 360 nm, 420 nm, 450 nm, or 500 nm, such as fluorescent lamps, mercury, metal additive and arc lamps. The light exposure time will vary from a fraction of a second to several minutes, depending upon the intensity and spectral energy distribution of the light, its distance from the composition, the nature and amount of the composition available, and the intensity of color in the image desired. There may also be used coherent light beams, for example, pulsed nitrogen lasers, argon ion lasers and ionized neon lasers, whose emissions fall within or overlap the ultraviolet absorption bands of the hexaarylbiimidazole or visible absorption bands of the quinones.

Ultraviolet or visible emitting cathode ray tubes widely useful in printout systems for writing on photosensitive materials are also useful for imaging the subject compositions. These in general involve an ultraviolet- or visible-emitting phosphor internal coating as the means for converting electrical energy to light energy and a fiber optic face plate as the means for directing the radiation to the photosensitive target. For purposes of this invention, the phosphors should emit strongly below 420 nm so as to substantially overlap the near ultraviolet-absorption characteristic or between about 420 nm to about 550 nm to overlap the visible absorption characteristics of the novel imaging compositions. Representative phosphors include the P4B (emitting at 300–550 nm, peaking at 410 nm) P16 (330–460 nm, peaking at 380 nm) and P22B (390–510 nm, peaking at 450 nm) types. Other phosphors which may be used are the P11 (400–560 nm, peaking at 460 nm) and $ZrP_2O_7$ types. (The Electronic Industries Association, New York, New York, assigns P-numbers and provides characterizing information on the phosphors; phosphors with the same P-number have substantially identical characteristics.)

Of course, it is to be understood that sources emitting principally in the ultraviolet will be most effective for color formation. In instances where a light source emits strongly in both regions, optical filters will be required to both eliminate the visible components for effective color formation and to permit deactivation without undesired color formation.

Images can be formed by a beam of light or by exposure to light of a selected area behind a negative, a stencil, or other relatively opaque pattern. The negative can be a silver negative with cellulose acetate or polyester film. The negative can also be one in which the opacity results from aggregations of areas of different refractive index. Image formation can also be accomplished in conventional diazo printing apparatus, or in a thermography device, provided the instrument emits some of its light in the ultraviolet range. A piece of onion-skin paper which bears typewriting, for example, will serve as a master pattern from which copies can be made.

The subject compositions are also activatable for the purposes of this invention by electron beams. The optimum conditions depend on the formulation and its thickness, the electron beam energy and the exposure time, and are readily determined by trial. Beams having average electron energies as low as about 10,000 electron volts and as high as about 2 million electron volts have been used successfully.

The deactivating radiation employed is visible light radiation. A notable feature of this invention is that no other deactivating conditions are necessary. Thus no special precautions need be taken to prevent concurrent imaging under ambient light conditions. Negative images stable to ambient light are obtained by imagewise exposing the composition to ultraviolet light. Positive images are obtained by first imagewise exposing the composition to visible light until the desired degree of deactivation in the exposed area is attained, followed by developing the resulting latent image by exposing the composition to ultraviolet light.

8. Usefulness

The novel compositions of this invention are useful in such diverse fields as optical printing and image-recording generally, dyeing of textiles and other materials, photography, thermography and pattern layout. The compositions are also useful to sense thresholds of light, heat, pressure and combinations thereof, through the color changes they undergo when activated by such stimuli. Some specific uses are:

1. Radiation dosimeters

These compositions can be used as papers to determine easily the quantity of solar radiation that falls on a particular surface. They may also be useful as low cost light-meters in photographic applications. For these uses, it is necessary to compare areas which have been exposed to previously calibrated papers or surfaces, in order to allow easy analysis of the degree of radiation.

2. Blue prints

These light-sensitive compositions can find application in diazo printout equipment, where they can be made to give readily a variety of shades, with different speeds and sensitivities. It is possible to utilize these materials with caution in ordinary room light, rather than have to handle them in the dark.

3. Printing applications

This invention is particularly useful for light-actuated colored image formation and provides a dry, non-silver photographic process capable of imaging in various colors and shades on various substrates, including fabrics, paper and similar fibrous sheet material. Apparatus useful in conducting photographic dye-printing is described in U.S. Pat Nos. 2,214,365 and 2,655,802. Even very soft paper, as, for example, tissue paper, which has been treated with a composition of this invention can be readily printed by projecting the desired graphic pattern onto the treated paper and irradiating it to effect the color-forming oxidation reaction. Subsequently, the image is fixed as described heretofore. These soft tissue paper compositions cannot be readily imaged by conventional printing techniques.

4. Pattern lay-out for metal working

The photosensitive composition can be applied to a metal surface when suitably formulated as a paint or a lacquer. The metal surface can then be marked by irradiation with light of one wavelength through a suitable template and the image so produced can be made permanent by irradiation with light of a second wavelength. The image may correspond to holes which are to be drilled or other operations of metal working and manufacture. This technique is particularly valuable when the metal to be marked has an irregular shape.

In general the compositions of this invention are broadly useful for optical printing and anywhere it is desirable to capture images as in photography, pattern-making, reproducing written, printed, drawn or typed matter, and recording radiation signals as line graphics, alphanumerics or other characters. The applied radiation can be passed through stencils, negatives or transparencies including half-tone and continuous tone negatives and positives in contact with or projected onto the composition; or, it can be reflected for impingement on the composition from printed or typed copy or objects that are opaque or transmit radiation poorly. Similarly, images of objects having areas differing in absorption and transmission characteristics are captured by placing the objects between the color forming radiation source and the composition, e.g., foot images can be recorded for fitting shoes. Multiple copies can be made using a single imaging exposure by stacking radiation-transparent assemblies comprising the composition coated on a transparent substrate such as ultraviolet-transparent film, paper, or glass.

In imaging applications, the ultimately desired dye optical density pattern can be constructed stepwise, according to one or more patterns, by exposing previously unexposed areas to suitable activating radiation and/or by reexposing previously underexposed areas (i.e., areas wherein the maximum obtainable optical density has not yet been fully developed) to one or more additional exposures. Such "add on" capability and versatility of the invention compositions is particularly useful in recording information and creating electronically generated displays and graphics. Because the recorded images have excellent resolution on paper and film, they are suitable for micro-imaging for data storage.

From the above description it can be seen that within the broad definition of this invention, those preferred photosensitive compositions contain one or more of the following:

a. A reductant portion of the redox couple which is 10–100 percent triethanolamine tripropionate or triethanolamine triacetate (with the latter more preferred) and 90–0 percent 3,3′,3′A,:-nitrilotripropionic acid, trimethyl ester.

b. A salt of dodecylbenzenesulfonic acid and an aminotriarylmethane containing at least two p-dialkylamino-substituted phenyl groups having ortho to the methane carbon atom a substituent which is alkyl, alkoxy, or halogen.

c. A hexaarylbiimidazole of the class 2,2′bis(o-substituted phenyl)-4,4′,5,5′-tetraarylbiimidazole.

d. As the oxidant portion of the redox couple a mixture of 1,6-pyrenequinone, 1,8-pyrenequinone, and 9,10-phenanthrenequinone.

e. Binders, with cellulose acetate butyrate the preferred binder.

f. Plasticizers, with alkyl arenesulfonamides present in amounts ranging from 40 to 70 and preferably a mixture of N-ethyl-p-toluene sulfonamide and o-phenylphenol condensed with ethylene oxide.

Photosensitive compositions of this invention, especially those embodying the above preferred components singly or in combination, demonstrate a variety of improved properties. For example, they are more stable in storage with less tendency towards crystallization and a resultant hazy coating. They retain maximum deactivation characteristics of speed, background stability and stability to fluorescent light. They demonstrate improved physical properties such as adhesion to substrate, resistance to finger-printing, improved tooth, improved pencil and felt-tip pen receptivity, and improved "X-eroxability." The compositions of this invention demonstrate these improved properties, and others, depending to considerable extent on the embodiment of the invention. Thus the photosensitive compositions of this invention embrace mixtures of essential ingredients along; as well as solutions of such mixtures in inert solvents; and coated articles utilizing paper, metal, films and other substrates.

These and other embodiments of this invention are illustrated in greater detail in the following examples.

EXAMPLE 1

A coating composition is prepared from the following ingredients:

| | |
|---|---|
| Acetone | 54 ml. |
| 2-Propanol | 6 ml. |
| 2,2′-Bis(o-chlorophenyl)-4,4′,5,5 ′-tetrakis(m-methoxyphenyl)biimidazole | 0.4180 g. |
| Tris(4-diethylamino-o-tolyl)methane | 0.0900 g. |
| p-Toluenesulfonic acid monohydrate | 0.400 g. |
| Triethanolamine triacetate | 1.0 ml. |
| 9,10-Phenanthrenequinone | 0.054 g. |
| Cellulose acetate butyrate (Eastman EAB 171-40) | 6.0 g. |
| Polyethyleneoxide adduct of o-phenylphenol average formula $C_6H_5$—$C_6H_4$—$O(CH_2CH_2O)_{2.25}H$. | 3.0 g. |

A high holdout, calendared, bleached, sulfite paper is coated with about 3 milliliters of the above composition per 1000 square centimeters and dried in the air.

Color formation speeds are measured using a contact printer with Sylvania Blacklite Blue fluorescent lamps. Irradiance is 2.75 milliwatts per square centimeter as measured with a YSI Radiometer, Model 65, with probe, Model 6551 in its protective plastic container, against the glass surface of the printer. (The indicated reading, 2.75 mw/cm², is estimated to be about 60 percent of that actually existing at the surface of the glass.) Samples are exposed for 30 seconds through a $\sqrt{2}$ or a $\sqrt[5]{2}$ stepwedge. The $\sqrt{2}$ stepwedge is vacuum deposited Inconel-X on quarts made by Mufoletto Optical Co. The $\sqrt[5]{2}$ stepwedge is a special made by Eastman Kodak, similar to their No. 3 film stepwedge, but with $\sqrt[5]{2}$ steps instead of $\sqrt{2}$.

Deactivation speeds are measured using a printer as above with Sylvania fluorescent lamps containing a special phosphor, PER–105. Irradiance is 5.0 milliwatts per square centimeter measured with the YSI as above. The same stepwedges are used as for color formation. Deactivation exposures of 60 seconds through stepwedges are followed by color formation exposures of 30 seconds without stepwedge to determine how much deactivation has occurred.

Max. OD is the visual diffuse optical density obtained on sample by color formation exposure through step No. 1 (clear area) of the stepwedge.

$ST_{0.7}(\sqrt[5]{2})$ is the stepwedge step number through which color formation sample density is 0.7 OD above unexposed background.

$ST_0(\sqrt[5]{2})$ is the deactivation stepwedge step number through which final color formation is only 0.03 OD above completely deactivated background.

Fluorescent Stability

A sample is exposed for 4 hours under a General Electric F15/T8 (cool-white) fluorescent light at 150 ± 7 foot candles as determined by a G.E. Type 213 Light Meter. The optical density as determined on a MacBeth RD–100 Densitometer is reported.

EXAMPLE 2

A coating composition is prepared from the following ingredients:

| | |
|---|---|
| Acetone, commercial | 270 ml |
| Isopropanol, reagent grade | 30 ml |
| Cellulose acetate butyrate (Eastman EAB 272-20) | 30 g |
| Polyethyleneoxide adduct of o phenylphenol [$C_6H_{nl}$—$C_6H_9$—$O(CH_2CH_2O)_{2.25}H$] | 6.0 g |
| Tris(4-diethylamino-o-tolyl)methane | 0.4500 g |
| N-ethyl-p-toluenesulfonamide | 7.5 g |
| 2,2′-Bis)o-chlorophenyl)-4,4′,5,5′-tetrakis(m-methoxyphenyl)biimidazole | 2.090 g |
| Dodecylbenzenesulfonic acid | 3.6 g |
| Pyrenequinone (a mixture of 1,6- and 1,8-isomers) | 0.015 g |
| 9,10-Phenanthrenequinone | 0.243 g |
| Triethanolamine triacetate | 5.125 ml |

As in Example 1, the above formulation can be coated on a suitable substrate to yield a composition which can be photoimaged and photofixed as described in Example 1. This formulation demonstrates improved compatibility of ingredients reflected in improved storage properties, both imaging and deactivation, and improved background stability.

EXAMPLES 3–5

A series of tests are carried out showing the effect of dodecylbenzenesulfonic acid and N-ethyl-p-toluenesulfonamide with various reductant components, in formulations similar to that of Example 2.

The results are shown in Tables I and II.

TABLE I

| Example Number | TMNTP,[1] ml. | TEATA,[2] ml. | PTSA, g. | DSA, g. | Initial Max. OD | $ST_{0.7}$ | $ST_0$ | Fluor. stab |
|---|---|---|---|---|---|---|---|---|
| 3 | 4.0 | 1.5 | | 3.60 | 1.05 | 9.5 | 10 | .09 |
| 4 | 3.5 | 2.0 | | 3.60 | 1.03 | 9 | 10 | .08 |
| 5 | 3.0 | 2.5 | | 3.60 | 1.10 | 11 | 9 | .09 |

[1] TMNTP is trimethyl 3,3',3''-nitrilotripropionate.
[2] TEATA is triethanolamine triacetate.

TABLE II

After 6 weeks

| Example No. | Max OD | $ST_{0.7}$ | $ST_0$ | Fluor. Stab. |
|---|---|---|---|---|
| 3 | 1.04 | 12 | 10 | 0.09 |
| 4 | 1.08 | 12 | 10 | 0.09 |
| 5 | 1.14 | 14 | 9 | 0.10 |

The sensitometric data given in Tables I and II are obtained, and are defined, as described in Example 1.

EXAMPLE 6

Based on the preceding Examples, a coating composition is prepared from the following ingredients:

| | |
|---|---|
| Acetone | 54 ml |
| 2-Propanol | 6 ml |
| 2,2'-Bis(o-chlorophenyl)-4,4',5,5'-tetrakis(m-methoxyphenyl)biimidazole | 0.4180 g |
| Tris(4-diethylamino-o-tolyl)methane | 0.0900 g |
| Dodecylbenzenesulfonic acid Richardson Co. Richonic Acid B) | 0.70 g |
| Triethanolamine triacetate | 0.4 ml |
| Trimethyl 3,3',3''-nitrilotripropionate | 0.6 ml |
| 9,10-Phenanthrenequinone | 0.0486 g |
| Cellulose acetate butyrate (Eastman EAB 272-20) | 6.0 g |
| Polyethyleneoxide adduct of o-phenylphenol [average formula $C_6H_5-C_6H_4-O(CH_2CH_2)_{2.25}H$] | 1.14 g |
| Pyrenequinone (a 1:1 mixture of 1,6- and 1,8-isomers) | 0.003 g |
| N-ethyl-p-toluenesulfonamide (Monsanto Chemical Company's Santicizer-3) | 1.3 g |

The cardinal advantage of this coating formulation is its freedom from crystallization and phase separation on storage, which enhances both its sensitometry and aesthetic appearance.

There is additionally an increase in resolution retention and decreased mottle when employed in the positive mode, than with the formulation of Example 1.

EXAMPLE 7

The formulation of Example 6 is applied to "Tyvek" spun-bonded olefin, Type 1058. Sensitometric properties obtained are identical to the formulation coated on a more conventional substrate, regular HG paper obtained from P. J. Schweitzer Co. However, a 35×increase in adhesion of the coating to the olefin substrate is found as compared to adhesion to paper.

EXAMPLE 8

The following formulation, a variation of Example 6, particularly in TMNTP/TEATA ratio, displays completely normal, useful, dual response properties.

| | |
|---|---|
| Acetone | 390 ml |
| 2,2'-Bis(o-chlorophenyl-4,4',5,5'-tetrakis(m-methoxyphenyl)biimidazole | 2.09 g |
| Tris(4-diethylamino-o-tolyl)methane | 0.450 g |
| Dodecylbenzenesulfonic acid | 6.8 g |
| Triethanolamine triacetate | 10.0 ml |
| Trimethyl 3,3',3''-nitrilotripropionate | 2.0 ml |
| 9,10-Phenanthrenequinone | 0.243 g |
| Cellulose acetate butyrate (Eastman EAB 272-20) | 30 g |
| Pyrenequinone (1:1 mixture of 1,6- and 1,8-isomers) | 0.015 g |
| N-ethyl-p-toluenesulfonamide | 6.0 g |

No crystallization is observed in the formulation after storage for several months.

EXAMPLE 9

A composition is prepared identical to that of Example 6 except that 0.10 grams of Silicone L-5410 is added for antiblock properties. Silicone L-5410 is described by Union Carbide, the manufacturer, as a silicone surfactant for use in urethane foam systems.

EXAMPLE 10

A composition is prepared identical to that of Example 6 except that 0.40 grams of "Syloid" 63 and 0.05 grams of a fluorocarbon ester of the formula $F(CF_2CF_2)_nCH_2CH_2O-CO-(CH_2)_{16}CH_3$, where $n=3$ and 4, are added. The "Syloid" is added for antiblock, anti-image transfer and to confer "writability." The "Syloids" are described as synthetic, micron-sized, amorphous silica gels, manufactured by the Davison Chemical Division of W. R. Grace and Company. The fluorocarbon ester is added to reduce blocking tendencies of coated papers and films.

EXAMPLE 11

Another useful photosensitive formulation consists of the composition of Example 6 containing 0.80 grams 325 mesh mica, (for example, white waterground mica supplied by the English Mica Co., Stanford, Conn.). The addition of mica decreases image transfer and blocking tendencies. Storage data after 3 months show no crystallization in this composition and the sensitometry is not affected by addition of the mica.

EXAMPLE 12

The following formulation is a simplified form of Example 6 for application where a reduced cost paper is desired. It has slower image and fix speeds and a lower maximum OD than the formulation of Example 6, but material costs are lower.

The coating composition is prepared from the following ingredients:

| | Amount | Wt. % |
|---|---|---|
| Acetone | 300 ml. | — |
| 2,2'-Bis(o-chlorophenyl)-4,4',5,5'-tetraphenylbiimidazole | 3.87 g. | 6.7 |
| Tris(4diethylamino-o-tolyl)methane | 0.675 g. | 1.2 |
| Dodecylbenzenesulfonic acid (Richardson Co. Richonic Acid B) | 3.5 g. | 6.0 |
| Triethanolamine triacetate | 6.7 ml. | 12.7 |
| 9,10-Phenanthrenequinone | 0.36 g. | 0.6 |
| Cellulose acetate butyrate (EAB-272-20) | 30 g. | 51.8 |
| Polyethyleneoxide adduct of o-phenylphenol [average formula $C_6H_5-C_6H_4-O(CH_2CH_2O)_{2.25}H$] | 5.7 g. | 9.8 |
| N-ethyl-p-toluenesulfonamide (Monsanto Chemical Company's "Santicizer"-3) | 6.5 g. | 11.2 |

The formulation is coated at 3 pounds per 3000 square feet on Schweitzer Regular HG paper. Further cost reductions can be realized by even lower weights on substrates such as diazo paper or newsprint.

The data below are obtained by imaging with Sylvania Blacklite Blue fluorescent lamps for 30 seconds at an intensity of 2 milliwatts per square centimeter. Deactivation irradiation (60 seconds, 5 milliwatts per square centimeter) is effected using the PER–105 lamps as described in Example 1.

Sensitometry Versus Coating Weight

| Coating Wt. lbs./3,000 ft.² | $OD_{max}$ | OD Deact. |
|---|---|---|
| 8–10 | 0.9–1.0 | 0.10–0.15 |
| 5 | 0.8–0.9 | 0.10–0.15 |
| 3 | 0.7–0.8 | 0.10–0.15 |

Imaging and fixing speeds are significantly slower; $OD_{max}$ about 20 percent lower; and background OD to room light slightly higher than obtained with the Example 6 formulation.

The resolution retention of this formulation is found to be 25 line pairs per millimeter initially; 5 line pairs per millimeter after 1 month ambient; and 3 line pairs per millimeter after 1 month wet storage.

This low-cost, dual response paper is useful as a pattern paper or marker in the garment industry.

EXAMPLE 13

This formulation is similar to that of Example 6 but is intended for applications in which aesthetics are not critical, such as in pattern making, toys, and novelties.

For some applications it is suitable to use a paper which is simply impregnated with photosensitive solution. The polymeric binder, such as cellulose acetate butyrate, can be eliminated giving rise to certain economic advantages, in particular reduced actives' cost and reducing coating costs. Simple spray or "kiss" coating techniques give a paper which is imageable on both sides. The principal problem encountered with impregnated, binderless coatings is storage stability, particularly with regard to crystallization and formation of such latent defects as fingerprints.

The following preferred composition provides an $OD_{max}=0.5 \pm 1$ on exposure to a Blacklite Blue source, when coated at 4.0 + 0.5 pounds per 3000 square feet of standard diazo base paper. Room light deactivates this paper to a white background. No fingerprints or other latent defects are observed during storage at 60° C. for 1 week.

| Component | Amount |
|---|---|
| Acetone | 1,080 ml. |
| 2-Propanol | 120 ml. |
| 2,2'-Bis(o-chlorophenyl)-4,4',5,5'-tetrakis(m-methoxyphenyl)biimidazole | 8.36 g. |
| Tris(4-diethylamino-o-tolyl)methane | 0.90 g. |
| Dodecylbenzenesulfonic acid (Richardson Co. Richonic Acid B) | 13.68 g. |
| Triethanolamine triacetate | 23.60 g. |
| 9,10-Phenanthrenequinone | 1.08 g. |
| Polyethyleneoxide adduct of o-phenylphenol [average formula $C_6H_5$—$C_6H_4$—$O(CH_2CH_2)_{2\ 25}H$] | 60.0 g. |
| N-ethyl-p-toluenesulfonamide (Monsanto Chemical Company's Santicizer-3) | 30.0 g. |
| Bis-(4-diethylamino-o-tolyl)(3,4-dimethoxyphenyl) methane | 0.90 g. |

The base paper is a standard diazograde paper, designated as Facsimile Direct Process Base Paper-Plain by Andrews Paper & Chemical Co., Inc., 15.2 pounds per 1000 square feet and 4 mils thick.

The papers are "Kiss" coated. Best results are obtained when the wrap angle on the kiss roll is adjusted to bring the substrate approximately tangent to the kiss roll. The kiss roll to web speed ratio should be between 1:1 and 2:1. Coating weights are controlled by varying the web and roll speeds.

EXAMPLE 14

In spray (aerosol) form, the compositions of this invention offer a new concept to the graphic arts and design industries. Now, virtually any type of material including metal, wood, cloth, paper, plastic, glass, and leather can be used as a proof. Relief areas and irregular surfaces become photosensitized by simply spraying with a composition as illustrated below. Positive or negative images can be reproduced almost instantly on these surfaces. The proof develops without processing and is self-fixing without liquids in ordinary room light.

The variety of applications is almost limitless. Existing proofs can be resensitized and additional proof copy added. Mock-ups of three dimensional objects such as cans, boxes, and displays, can be proofed. Proofs can be "pulled" on the same paper, foil, or fabric that is to be used in final production. In some small-quantity applications, the "proof" may even be the end product.

A preferred dual response, photosensitive aerosol (spray) composition contains the following components:

| Component | Amount |
|---|---|
| Acetone | 59.92 g. |
| 2,2'-Bis(o-chlorophenyl)-4,4',5,5'-tetrakis(m-methoxyphenyl)biimidazole | 0.258 g. |
| Tris(4-diethylamino-o-tolyl)methane | 0.054 g. |
| Dodecylbenzenesulfonic acid (Richardson Co. Richonic Acid B) | 0.423 g. |
| Triethanolamine triacetate | 0.272 g. |
| Trimethyl 3,3',3''-nitrilotripropionate | 0.407 g. |
| 9,10-Phenanthrenequinone | 0.030 g. |
| Cellulose acetate butyrate | 3.7 g. |
| Polyethyleneoxide adduct of o-phenylphenol [average formula $C_6H_5$—$C_6H_4$—$O(CH_2CH_2)_{2\ 25}H$] | 0.705 g. |
| Pyrenequinone (a 1:1 mixture of 1,6- and 1,8-isomers | 0.0018 g. |
| N-ethyl-p-toluenesulfonamide (Monsanto Chemical Companys's Santicizer-3) | 0.803 g. |
| Methylene chloride | 27.0 g. |
| 2B Alcohol | 5.4 g. |
| Dichlorodifluoromethane | 81 g. |

The above composition is conveniently applied from a conventional aerosol dispensing cannister. The spray is a photosensitive solution which forms a blue image after exposure to ultraviolet light for 15 to 20 seconds.

In subdued room light, the desired surface can simply be sprayed with the above formulation. The surface must be dry and free of grease. The spray is applied evenly from side to side, applying two or three light coats (glass and other gloss surfaces require additional coverage). Each coat is allowed to dry for 30 seconds.

A transparent master copy, film negative or stencil is placed over the treated area and both are brought into tight contact. Exposure is made through the master with blacklight blue fluorescent ultraviolet light for 15 seconds or longer. This finishes the printing operation. No other developing is necessary as the spray will self-fix under normal room light in about one hour. If more rapid fixing is desired, the sensitized area can be exposed to an intense visible light source such as pulsed Xenon for one or two minutes.

Because the color in the blue image areas can be controlled by the length of exposure to ultraviolet light, multiple "burns" are possible. With the above formulation, each "burn" is visible immediately after exposure. Two or more color separations can thereby be exposed on the same surface. Even continuous tone proofing is possible.

EXAMPLE 15

A particularly preferred composition, especially useful for both single and two-side coated papers, is the following:

| Component | Amount | % of Non-Volatiles |
|---|---|---|
| Acetone | 300 ml. | |
| 2,2'-Bis(o-chlorophenyl)-4,4',5,5'-tetrakis(m-methoxyphenyl)biimidazole | 2.30 g. | 4.24 |

| | | |
|---|---|---|
| Tris(4-diethylamino-o-tolyl)methane | 0.450 g. | 0.83 |
| Dodecylbenzenesulfonic acid (Richardson Co. Richonic Acid B) | 2.9 g. | 5.34 |
| Triethanolamine triacetate | 2.46 g. | 4.53 |
| Trimethyl 3,3',3''-nitrilotripropionate | 3.7 g. | 6.82 |
| 9,10-Phenanthrenequinone | 0.243 g. | 0.45 |
| Cellulose acetate butyrate (EAB-531-1) | 6.0 g. | 11.1 |
| Cellulose acetate butyrate (EAB-171-40) | 24.0 g. | 44.2 |
| Polyethyleneoxide adduct of o-phenyl-phenol [average formula $C_6H_5—C_6H_4—O(CH_2CH_2O)_{2\ 25}H$] | 6.5 g. | 12.0 |
| Pyrenequinone (a 1:1 mixture of 1,6- and 1,8- isomers) | 0.015 g. | 0.03 |
| N-ethyl-p-toluenesulfonamide (Monsanto Chemical Company's Santicizer-3) | 5.7 g. | 10.5 |

EXAMPLE 16

The following two coating formulations were prepared and coated to yield a dried film, weighing about 7 pounds/3000 square feet, on Schweitzer Regular HG paper.

| | A | B |
|---|---|---|
| Acetone | 180 ml. | 180 ml. |
| 2,2'-Bis(o-chlorophenyl)-4,4',5,5'-tetrakis(m-methoxyphenyl)biimidazole | 1.02 g | 1.02 g |
| Tris(4-diethylamino-o-tolyl)methane | 0.21 g | 0.21 g |
| Dodecylbenzenesulfonic acid (Richardson Co., Richonic Acid B) | 2.7 g | — |
| p-Toluenesulfonic acid | — | 1.2 g |
| Trimethyl 3,3',3''-nitrilotripropionate | 3 ml. | 3 ml. |
| 9,10-Phenanthrenequinone | 0.18 g | 0.18 g |
| Cellulose acetate butyrate (Eastman EAB 272-20) | 18 g | — |
| Cellulose acetate butyrate (Eastman EAB 171-40) | — | 18 g |
| Polyethyleneoxide adduct of o-phenyl-phenol [average formula $C_6H_5—C_6H_4—O(CH_2CH_2)_{2\ 25}H$] | 4.8 g | 9 g |
| Pyrenequinone (a 1:1 mixture of 1,6- and 1,8- isomers) | 0.009 g | 0.009 g |
| N-ethyl-p-toluenesulfonamide (Monsanto Chemical Company's Santicizer-3) | 4.2 g | — |

The above two dual response papers were employed to obtain positive hard copy by projecting through microfilm (blowback) using the apparatus and coirradiation technique substantially as described in Example 4 of copending application, Ser. No. 64,220, filed Aug. 17, 1970. Formulation B is essentially the composition described in U.S. Pat. No. 3,390,994.

Prior to effecting the above coirradiation, however, the coated papers were maintained two weeks in a chamber at 100° F. and 80 percent relative humidity. These conditions provide an accelerated means for ascertaining storage stability.

The results obtained for formulations A and B, following accelerated storage, showed that composition B exhibited latent imaging defects, i.e., areas which did not image, particularly where the paper had been handled. Under the same conditions, the composition of this invention, composition A, demonstrated a significantly reduced amount of this type of defect.

The above detailed description is given for clearness of understanding only and no unnecessary limitations are to be understood therefrom. The invention is not limited to the exact details shown and described, as obvious modifications will occur to those skilled in the art.

The embodiments of the invention in which an exclusive property or privilege is claimed are defined as follows:

1. An improved photosensitive composition comprising an intimate admixture of
   a. an acid salt of an oxidizable, leuco aminotriarylmethane and a salt forming strong acid;
   b. a hexaarylbiimidazole which absorbs principally in the ultraviolet region and is a photooxidant for the leuco aminotriarylmethane;
   c. a redox couple containing (1) as an oxidant a polynuclear quinone absorbing principally in the 430 nm to 550 nm region, and (2) as a reductant, a lower alkyl ester of nitrilotriacetic or nitrilotripropionic acid, an acyl ester of triethanolamine of the formula

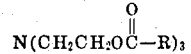

wherein R is alkyl of one to four carbon atoms, or mixtures of these; and
   d. a plasticizer;

the improvement comprising the use of an alkyl benzenesulfonic acid of the formula

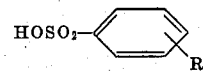

wherein R is alkyl of six to 16 carbon atoms, as said salt forming strong acid, and the use of a plasticizer containing (1) from 30 to 80 weight percent of an arene sulfonamide of the formula

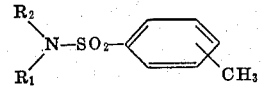

wherein $R_1$ and $R_2$ are the same or different and are hydrogen, alkyl of one to four carbon atoms or 2-hydroxyethyl,
and (2) from 70 to 20 weight percent of another plasticizer.

2. A composition of claim 1 wherein the reductant is a mixture of a lower alkyl ester of nitrilotriacetic or nitrilotripropionic acid with triethanol amine triacetate or triethanolamine tripropionate.

3. A composition of claim 1 wherein the leuco aminotriarylmethane is one wherein at least two of the aryl groups are phenyl groups having (a) an $R_1R_2N$-substituent in the position para to the bond to the methane carbon, wherein $R_1$ and $R_2$ are each hydrogen, alkyl of one to 10 carbon atoms, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, which can be the same as or different from the first two, is, when different from the first two, thienyl, furyl, oxazylyl, pyridyl, thiazolyl, indolyl, indolinyl, benzooxazolyl, quinolyl, benzothiazolyl, phenyl, naphthyl, or such groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, arylsulfonamide of 6 to 10 carbon atoms, nitro or benzylthio;
the hexaarylbiimidazole is a 2,2',4,4',5,5'-hexaphenylbiimidazole in which the phenyl groups can contain substituents having Hammet sigma values of from −0.4 to 0.4.

4. A composition of claim 2 wherein the lower alkyl ester of nitrilotriacetic or nitrilotripropionic acid is the trimethyl ester of 3,3',3''-nitrilotripropionic acid.

5. A composition of claim 2 wherein the leuco aminotriaryl methane has the structural formula

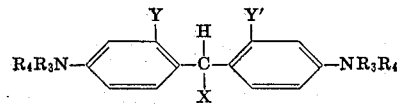

wherein $R_3$ and $R_4$ are benzyl or lower alkyl;
Y and Y' are lower alkyl, lower alkoxy or halogen; and
X is

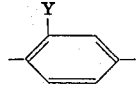

$NR_3R_4$-phenyl, 3,4-dimethoxyphenyl, or p-benzylthiophenyl;

the hexaarylbiimidazole is a 2,2'-bis(o-substituted phenyl)-4,4',-5,5'-tetraarylbiimidazole with the substituent selected from among fluorine, chlorine, bromine, methyl and methoxy; and the polynuclear quinone is a mixture of 1,6-pyrenequinone and 1,8-pyrenequinone or their mixture with 9,10-phenanthrenequinone.

6. A composition of claim 2 wherein the acyl ester of triethanol amine is triethanolamine triacetate, and it comprises 25 to 60 percent of the reductant component.

7. A composition of claim 2 wherein the alkyl substituent on the benzenesulfonic acid contains from eight to 14 carbon atoms and the plasticizer contains from 40 to 80 weight percent of a sulfonamide plasticizer.

8. A composition of claim 7 wherein the lower alkyl ester of nitrilotriacetic or nitrilotripropionic acid is the trimethyl ester of 3,3',3''-nitrilotripropionic acid.

9. A composition of claim 8 wherein the acyl ester of triethanolamine is triethanolamine triacetate.

10. A composition of claim 1 wherein the leuco aminotriaryl methane is tris(4-diethylamino-2-tolyl)methane; the hexaarylbiimidazole is 2,2'-bis(o-chlorophenyl)-4,4',5,5'-tetrakis(m-methoxyphenyl)biimidazole; the polynuclear quinone is a mixture of 1,6-pyrenequinone with 1,8-pyrenequinone, and 9,10-phenanthrenequinone; the reductant is a mixture of triethanolamine triacetate and the trimethyl ester of 3,3',3''-nitrilotripropionic acid; the salt forming acid is dodecylbenzenesulfonic acid and the plasticizer contains 40 to 80 weight percent of N-ethyl-p-toluenesulfonamide.

11. A composition of claim 1 wherein the leuco amino-triarylmethane is tris(4-diethylamino-o-tolyl)methane; the hexaarylbiimidazole is 2,2'-bis(o-chlorophenyl)-4,4',5,5'-tetrakis(m-methoxyphenyl(biimidazole; the polynuclear quinone is 9,10-phenanthrenequinone; the reductant is triethanolamine triacetate; the salt forming acid is dodecylbenzenesulfonic acid and the plasticizer contains 40 to 80 weight percent of N-ethyl-p-toluenesulfonamide.

12. A composition of claim 1 wherein the leuco amino triarylmethane is bis(p-diethylamino-o-tolyl)(3,4-dimethoxyphenyl)methane; the hexaarylbiimidazole is 2,2'-bis(o-chlorophenyl)-4,4',5,5'-tetrakis(m-methoxyphenyl)biimidazole; the polynuclear quinone is 9,10-phenanthrenequinone; the reductant is triethanolamine triacetate; the salt forming acid is dodecylbenzenesulfonic acid and the plasticizer contains 40 to 80 weight percent of N-ethyl-p-toluenesulfonamide.

13. A composition of claim 1 in admixture with an inert organic solvent or water moisture.

14. A composition of claim 1 coated on a substrate.

15. A composition of claim 1 impregnated in a substrate.

16. A composition of claim 1 coated on paper.

17. A composition of claim 1 coated on a plastic film.

18. A composition of claim 1 coated on a metal.

19. A composition of claim 1 located on both sides of paper.

20. A composition of claim 1 combined with a light transparent polymeric binder.

21. A composition of claim 20 in the form of a self-supporting film.

* * * * *